Figure 1:
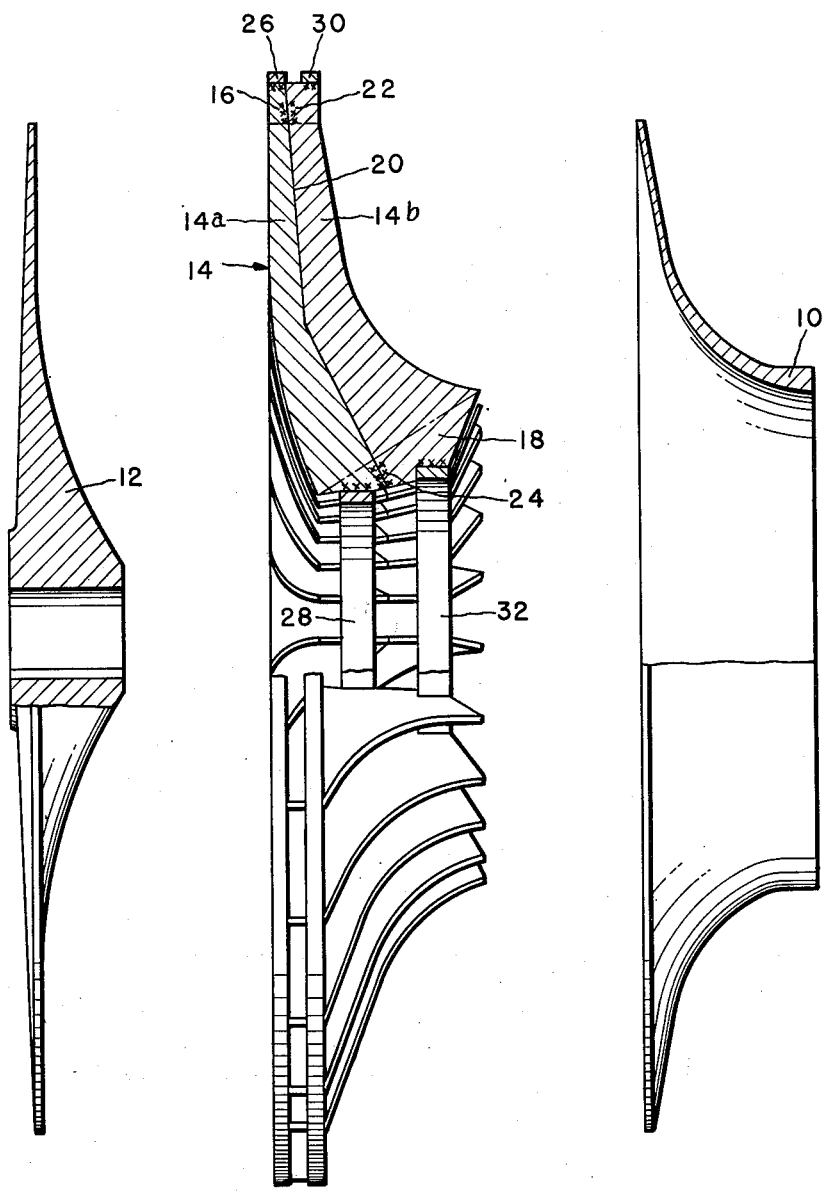

Oct. 1, 1957   J. H. WAGNER ET AL   2,807,871
METHOD OF MAKING AN IMPELLER
Filed Jan. 22, 1957   2 Sheets-Sheet 1

INVENTORS
JOHN H. WAGNER
EDMUND C. CURRY
BY
THEIR ATTORNEY

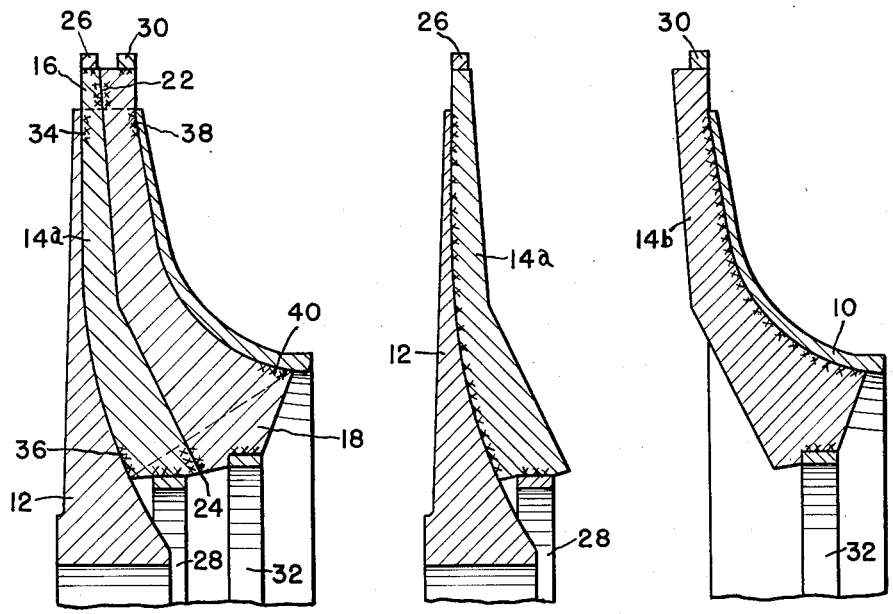
FIG. 2   FIG. 3   FIG. 4
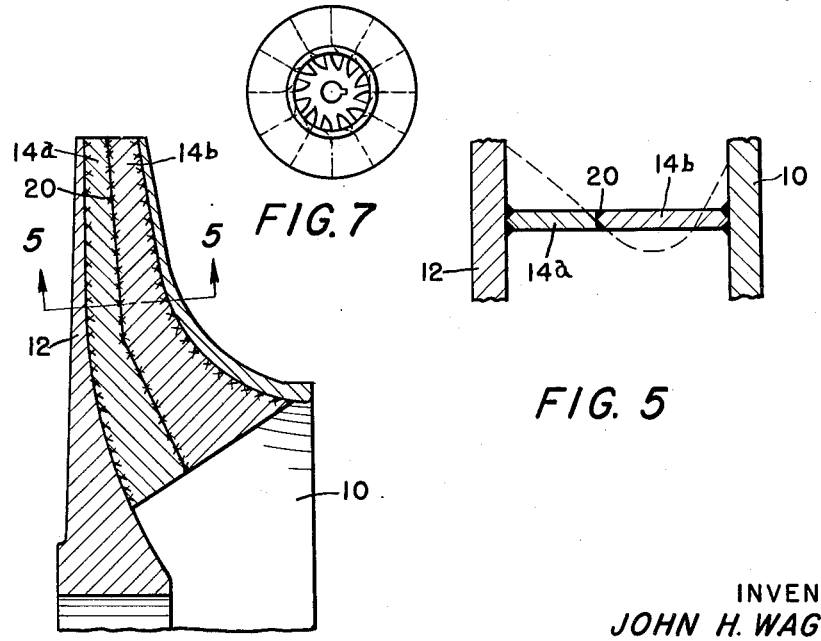
FIG. 7
FIG. 5
FIG. 6
INVENTORS
JOHN H. WAGNER
EDMUND C. CURRY
BY
THEIR ATTORNEY

United States Patent Office 2,807,871
Patented Oct. 1, 1957

2,807,871

METHOD OF MAKING AN IMPELLER

John H. Wagner, Phillipsburg, N. J., and Edmund C. Curry, Easton, Pa., assignors to Ingersoll-Rand Company, New York, N. Y., a corporation of New Jersey Application January 22, 1957, Serial No. 635,201

5 Claims. (Cl. 29—156.8)

This invention relates to impellers, and more particularly to the method of forming a welded impeller for centrifugal type compressors and the like.

One object of this invention is to reduce the cost of fabricating impellers.

A second object of the invention is to form the impeller in such a fashion as to insure that the impeller is structurally sound throughout and capable of withstanding stresses under extremely high centrifugal load forces.

Another object of the invention is to form the impeller in such a fashion that welding at lines of high stress are readily accessible to the welder during the welding operation, and that the line of welding in the lesser accessible places are at lines of minimum stress.

Further objects will become apparent from the following specification and drawings, in which Figure 1 is an exploded view of the impeller blades, held in assembled position, and the disk and cover, Fig. 2 shows the half section of an impeller and associated parts of Fig. 2 but in the assembled relation, Fig. 3 shows the impeller disk with one half of an impeller blade welded thereto, Fig. 4 shows the impeller cover with the other half of the impeller blade welded thereto, Fig. 5 is a cross sectional view of Fig. 6 taken along the line 5—5 looking in the direction of the arrows, Fig. 6 is a half section of the impeller in its final assembled form, and Fig. 7 is a diagrammatic view showing the general form of the impeller as viewed from an end.

Impellers of the type to which this invention relates generally consist of a housing made up of a centrally bored, generally volcanic shaped cover 10 and of a disk 12 which is substantially flat at its marginal portions with the central portion curving axially outward to form a frusto-conically shaped hub. A plurality of curved blades 14 are mounted in spaced relation between the two housing elements and radiating from the hub of the disk 12 (see Fig. 7). Efforts have been made to form a welded impeller made up of the three components just mentioned and in which the impeller blades are welded along their axial outer sides to the housing members. The difficulty associated with this construction is that it is extremely difficult, if not impossible, for a welder to weld effectively along this line as it is difficult to see along the length of this joint. Moreover, this line of weld is at the point of high stress as is illustrated by the dotted line in Fig. 5, the point of zero bending stress being on the horizontal line passing through the center of the blades.

The present invention involves a method of fabricating a welded impeller which avoids all the disadvantages previously mentioned. The steps of the method are as follows:

First, a plurality of impeller blades 14 are formed to the desired final conformation and size with the exception that they are slightly elongated at their opposite ends to form holding tips 16 and 18.

Each blade is then cut longitudinally, along line 20, into two parts 14ª and 14ᵇ. Preferably the cutting line 20 is located along the line of minimum stress in the blade when the impeller is finally assembled (see Fig. 5).

The blade parts 14ª and 14ᵇ are then placed in assembled relation relative to each other and held together at their radial inner and outer ends by tack-welding the tips 16 and 18 at the areas indicated by the numerals 22 and 24, respectively.

The blades are then secured in their final assembled relation relative to each other by tack-welding the tips 16 and 18 of part 14ª to an outer ring 26 and inner ring 28, respectively, the part 14ᵇ being similarly welded to rings 30 and 32.

The disk 12 and cover 10 are then fitted on the blades 14, with the part 14ª being secured to the disk 12 by tack-welding at its radial inner and outer end portions 34 and 36, respectively, and inward of the tips 16 and 18. The blade parts 14ᵇ are similarly secured to the casing member 10 at the points 38 and 40. It is immaterial which part of a blade is welded to the housing first.

The welds at 22 and 24 are then broken to release said blade parts from each other to permit separation of the disk member and casing member from each other. The disk 12 and associated blade parts 14ª and the casing 10 and associated blade parts 14ᵇ are then heated, for example to a temperature approximately 500° F., and each blade is then welded along its entire lengths to the disk 12 and cover 10.

The preferable order of welding being that all blade parts (e. g., 14ª) are welded on one side only of each blade and then the other side of each blade is welded. Moreover it is desirable in the welding process to weld alternate blades. In other words the welder welds along one side of "number one" blade part 14ª and then along one side of "number three" blade part 14ª and so on until all blade parts 14ª are welded on one side. The other side of the blade part 14ª is then similarly welded. The same process is carried out in welding the blade parts 14ᵇ to the casing 10. At this point in the process of making the impeller, the parts are as shown in Figs. 3 and 4.

Thereafter the two parts shown in Figs. 3 and 4 are placed in their final assembled relation relative to each other and the blades are tack-welded at their inner and outer end portions along the line 20, but inward of the tips 16 and 18. The tips 16 and 18 are then cut from the impeller blades and the two blade parts welded along their entire lengths on each side at the parting line 20. Here again it is desirable to weld the blades along one side only until all blades on that side are welded and then to weld the other side of all blades, and to skip alternate blades during the welding process in the same manner defined in connection with the process of welding a blade part to a housing member.

It is to be noted that it is possible to carry out this invention if the tips 16 and 18 are cut off after the blade halves are welded to the disk and cover and before the two parts of Figs. 3 and 4 are assembled, instead of being cut off after the impeller is assembled and tack-welded at the ends of the blade parting line.

We claim:

1. The method of forming an impeller comprising the steps of dividing the impeller blades longitudinally into two parts, holding together the two parts at the radial inner end and outer ends of each blade, securing the blades in their final assembled positions relative to each other, securing the radial inner and outer end of portions at the axial outer side of each blade part of one of said parts to a disk member and similarly securing each blade part of the other of said parts to a cover member, releasing said blade parts at the points of holding aforesaid and separating the disk member and cover member with the blade parts thereof, permanently securing each blade part along its length to the member on which it had been previously secured, replacing the disk and cover members and blade parts in their final assembled relation, and securing the blade parts together along the line of said dividing.

2. The method of forming a welded impeller comprising the steps of forming a plurality of impeller blades to the desired final conformation and size except that each blade is formed slightly elongated at both ends over the final desired length of blade, dividing the impeller blades longitudinally into two parts, holding together the two parts of each blade at its radial inner end and outer end, securing the blades in their final assembled positions by securing said ends to holding elements, tack-welding the radial inner and outer end portions at the axially outer side of each blade part of one of said parts to a disk member and similarly securing each blade part of the other of said parts to a cover member, releasing said blades at the points of holding aforesaid and separating the disk member and cover member, welding each blade part along its length to the member on which it had been previously tack-welded, replacing the disk and casing members and blade parts in their final assembled relation, and welding the blade parts of each blade together along the line of said dividing.

3. The method of forming a welded impeller claimed in claim 2 in which the impeller blade is divided along the line of minimum stress when the impeller is completely assembled.

4. The method claimed in claim 2 in which the disk and cover members are preheated prior to welding the blade parts thereto.

5. The method claimed in claim 4 in which during the step of welding blade parts to a member, each succeeding blade part being welded is spaced at least one blade part from the blade part last welded.

References Cited in the file of this patent
UNITED STATES PATENTS

| | | |
|---|---|---|
| 2,336,303 | Schubert | Dec. 7, 1943 |
| 2,384,265 | Sollinger | Sept. 4, 1945 |